(12) United States Patent
Wang et al.

(10) Patent No.: US 9,336,578 B2
(45) Date of Patent: May 10, 2016

(54) INTERACTIVE TONE MAPPING FOR HIGH DYNAMIC RANGE VIDEO

(75) Inventors: Zhe Wang, Plainsboro, NJ (US); Jiefu Zhai, Cupertino, CA (US); Joan Llach, Cesson-Sevigne (FR)

(73) Assignee: THOMSON LICENSING, Issy les Moulineaux (FR)

( * ) Notice: Subject to any disclaimer, the term of this patent is extended or adjusted under 35 U.S.C. 154(b) by 708 days.

(21) Appl. No.: 13/395,887

(22) PCT Filed: Sep. 14, 2010

(86) PCT No.: PCT/US2010/002497
§ 371 (c)(1),
(2), (4) Date: Jun. 10, 2012

(87) PCT Pub. No.: WO2011/031331
PCT Pub. Date: Mar. 17, 2011

(65) Prior Publication Data
US 2012/0237130 A1    Sep. 20, 2012

Related U.S. Application Data

(60) Provisional application No. 61/276,626, filed on Sep. 14, 2009.

(51) Int. Cl.
*G06T 5/00* (2006.01)

(52) U.S. Cl.
CPC ....... *G06T 5/009* (2013.01); *G06T 2207/10016* (2013.01); *G06T 2207/20092* (2013.01); *G06T 2207/20208* (2013.01)

(58) Field of Classification Search
USPC .................................. 382/254, 274; 715/723
See application file for complete search history.

(56) References Cited

U.S. PATENT DOCUMENTS

| | | | |
|---|---|---|---|
| 6,744,968 B1 | 6/2004 | Imai et al. | |
| 6,968,337 B2 * | 11/2005 | Wold | |
| 7,551,776 B2 | 6/2009 | Jeffrey et al. | |
| 7,643,035 B2 | 1/2010 | Toyama et al. | |
| 7,786,999 B1 | 8/2010 | Reid | |
| 7,805,678 B1 | 9/2010 | Niles et al. | |

(Continued)

FOREIGN PATENT DOCUMENTS

| | | |
|---|---|---|
| JP | H11-313244 A | 11/1999 |
| JP | 2000-100129 A | 4/2000 |

(Continued)

OTHER PUBLICATIONS

Chen et al., "A Multicurve Tone Mapping Operator for the Display of High Dynamic Range Image and Video" IEEE Conference, London, GB, Nov. 27, 2007, pp. 1-7.

(Continued)

*Primary Examiner* — Ishrat I Sherali
(74) *Attorney, Agent, or Firm* — Robert D. Shedd

(57) ABSTRACT

A user interactive video tone mapping method is provided that can be used for the tone reproduction of high dynamic range (HDR) content on low dynamic range (LDR) displays. The method comprises the steps of selecting a frame of a video sequence; providing a user interface for a user to manually apply scribble marks to the frame; manually applying N scribble marks to the frame, N being a whole number of value 1 or greater; and tone mapping the video sequence responsive to the scribble marks.

22 Claims, 2 Drawing Sheets

(56) References Cited

U.S. PATENT DOCUMENTS

| | | | |
|---|---|---|---|
| 8,237,730 | B1 | 8/2012 | Anderson et al. |
| 2002/0198789 | A1* | 12/2002 | Waldman .................. 705/26 |
| 2004/0001079 | A1 | 1/2004 | Zhao et al. |
| 2005/0243176 | A1 | 11/2005 | Wu et al. |
| 2006/0018538 | A1 | 1/2006 | Jeffrey et al. |
| 2006/0153445 | A1 | 7/2006 | Lin |
| 2006/0240862 | A1* | 10/2006 | Neven et al. ............. 455/550.1 |
| 2008/0025633 | A1 | 1/2008 | Szeliski |
| 2008/0064349 | A1 | 3/2008 | Flask et al. |
| 2008/0263450 | A1 | 10/2008 | Hodges et al. |
| 2010/0080448 | A1 | 4/2010 | Tam et al. |
| 2010/0153520 | A1 | 6/2010 | Daun et al. |
| 2010/0157078 | A1 | 6/2010 | Atanassov et al. |
| 2010/0260426 | A1* | 10/2010 | Huang et al. ................. 382/218 |
| 2010/0281371 | A1 | 11/2010 | Warner et al. |
| 2010/0281382 | A1 | 11/2010 | Meaney et al. |
| 2010/0281384 | A1 | 11/2010 | Lyons et al. |
| 2011/0090959 | A1 | 4/2011 | Wiegand et al. |
| 2012/0017152 | A1 | 1/2012 | Matsuda et al. |

FOREIGN PATENT DOCUMENTS

| | | |
|---|---|---|
| WO | WO2008064349 | 5/2008 |
| WO | WO2009/078862 A1 | 6/2009 |
| WO | WO2010/071839 A1 | 6/2010 |

OTHER PUBLICATIONS

Chen et al., "Real-Time Edge-Aware Image Processing with the Bilateral Grid", ACM, New York, Jul. 2007.

Han et al., "Automatic Illumination and Color Compensation using Mean Shift and Sigma Filter", IEEE Transactions on Consumer Electronics, vol. 55, No. 3, Aug. 2009, pp. 978-986.

Lee et al., "Gradient Domain Tone Mapping of High Dynamic Range Videos", Image Proessing, 2007 ICIP 2007, Sep. 1, 2007, pp. III-461.

Lischinski et al.. "Interactive Local Adjustment of Tonal Values", ACM. New York. 2006.

Search Report Dated Dec. 8, 2010.

Adobe Systems Inc., "Using Adobe Photoshop Lightroom 2, Chapter 8: Developing photos," Sep. 3, 2009, pp. I-V, 98-123, Retrieved from Internet Sep. 7, 2011.

Wang et al., "Interactive Tone Mapping for High Dynamic Range Video," ICASSP 2010, pp. 1014-1017.

Canon, "Technical Report: Software for High-Speed Raw Image Processing and Real-Time Editing," Jul. 2004, Retrieved from Internet Jul. 27, 2005, pp. 1-5.

Long, Ben., "Take a First Look at Adobe's Lightroom," Jan. 11, 2006, retrieved from http://www.creativepro.com/article/take-a-first-look-at-adobe-s-lightroom, p. 4.

* cited by examiner

INTERACTIVE TONE MAPPING FOR HIGH DYNAMIC RANGE VIDEO

CROSS-REFERENCE TO RELATED APPLICATIONS

This application claims the benefit, under 35 U.S.C. §365 of International Application PCT/US2010/002497, filed Sep. 14, 2010, which was published in accordance with PCT Article 21(2) on Mar. 17, 2011 in English and which claims the benefit of U.S. provisional patent application No. 61/276,626, filed Sep. 14, 2009.

FIELD OF THE INVENTION

The invention relates to the tone reproduction of high dynamic range (HDR) content on low dynamic range (LDR) displays and provides an improved method of tone reproduction driven by user scribe marks to selected frames of video.

BACKGROUND OF THE INVENTION

High dynamic range (HDR) displays are displays that can display imagery with very high contrast, very deep blacks and very bright whites. Such types of displays can show HDR imagery by using non-uniform backlighting. In particular, one can adjust the intensity of the backlighting on different areas of the screen based on the input image. These displays have received much attention in the recent years as an alternative format for digital imaging.

The traditional Low Dynamic Range (LDR) image format was designed for displays compliant with ITU-R Recommendation BT 709 (a.k.a. Rec. 709), where only two orders of magnitude of dynamic range can be achieved. However, real world scenes have a much higher dynamic range which are around ten orders of magnitude in daytime. The human visual system (HVS) is capable of perceiving 5 orders of magnitude.

Because most display devices have a limited dynamic range, HDR scenes shown on Low Dynamic Range (LDR) display devices usually turn out to be either saturated (corresponding to the concept of "overexposure" in photography) or extremely dark (corresponding to "underexposure"). Either case is undesired as numerous details can be lost. Therefore, a process called tone mapping or tone reproduction is needed to let the HDR contents be displayable on traditional display devices.

Tone mapping for HDR video has drawn much attention in academia as well as in industry. However, compared with the tone mapping of still images, relatively very little effort has been put on HDR video tone mapping. Particularly, tone mapping for HDR images has been studied in recent years in computer graphics as well as in image and video processing. Roughly speaking, tone mapping methods can be classified into two primary categories: global tone mapping and local tone mapping.

Although local tone mapping using a gradient domain method to video has added a smoothness constraint term along the motion direction which helps to reduce temporal brightness fluctuation, the control of the image appearance is limited as this mapping method tends to generate images with artificial look and seems to have a limited number of ways to control the image appearance.

One publication (Interactive Local Adjustment of Tonal Values by Dani Lischinski, Zeev Farbman, Matt Uyttendaele, Richard Szeliski in ACM Transactions on Graphics, 25(3) (Proc. ACM SIGGRAPH 2006), July 2006) provided a scribble based interactive tone mapping approach for HDR images. This method shows flexibility in terms of changing the appearance of image. However, the extension of such a method to HDR video is very difficult because it is not practical to draw scribble marks on each frame. Tracking scribbles along temporal axis is also not feasible if there exists complex motion.

As such, a need exists to develop a method for HDR video tone mapping that incorporates user interactivity to improve the tone mapping quality, but yet does not require the user to directly mark each frame in a video sequence to achieve high quality tone mapping.

SUMMARY OF THE INVENTION

A user interactive video tone mapping method is provided that can be used for the tone reproduction of high dynamic range (HDR) content on low dynamic range (LDR) displays. The method comprises the steps of selecting a frame of a video sequence; providing a user interface for a user to manually apply scribble marks to the frame; manually applying N scribble marks to the frame, N being a whole number of value 1 or greater; and tone mapping the video sequence responsive to the scribble marks. The method can further include classifying pixels in the frame to N categories in which the N categories correlate to the N scribble marks and the classifying can be applied to all frames in the video sequence. The method can further include generating an initial exposure map for the frame, wherein the initial exposure map is used to classify the pixel in the classifying step; applying an edge preserving filter to generate a final exposure map, wherein the tone mapping step is further performed responsive to the final exposure map; add creating feature vectors from initial input pixel data of the video sequence for each pixel along the N scribe marks, such that the classifying step is responsive to the feature vectors. The method further can include using one Gaussian mixture model in creating the feature vectors, wherein the feature vectors of the pixels at least include three luminance values, a first value for the luminance of a given pixel itself, and the others being average luminance of the neighboring pixels using different window sizes.

BRIEF DESCRIPTION OF THE DRAWINGS

The invention will now be described by way of example with reference to the accompanying figures of which.

DETAILED DESCRIPTION OF THE EMBODIMENTS

The invention which will now be described is essentially a user interactive video tone mapping method that can be used for the tone reproduction of high dynamic range (HDR) content on low dynamic range (LDR) displays. A key feature of the invention is a user interface adapted to permit the user to access a sequence of frames of video data, select or determine one key frame of the sequence, and apply or draw one or more scribbles or marks to the key frame in order enhance or modify features in specific locations of a frame responsive ideally to the preference and/or desire of the user. This user input information is then propagated across the output video sequence automatically, which greatly reduces the manual input load. Meanwhile, the flexibility of changing the photographic appearance is still preserved.

Based on the input scribbles in the keyframe, the method can train several Gaussian Mixture Models (GMM) to capture the information of the scribbles. Afterwards, all the pixels in the video are classified using the trained GMM models and the initial exposure values are set for all pixels. An edge preserving filtering can then be applied to smooth the exposure map of each frame to obtain the final exposure map for each frame. The exposure map can be a floating point matrix that contains the exposure value for each pixel in the HDR image. The tone mapped HDR video is then obtained by dividing each HDR frame by its corresponding exposure map.

The method can be characterized as a stable and flexible interactive video tone mapping algorithm, wherein the method ultimately estimates an exposure map for each frame. The exposure map is a two dimension matrix that has the same size as the picture. Each entry of the exposure map can be seen as the exposure value for the pixel at that location. The tone mapped video can be obtained by dividing the original video frame by the corresponding exposure map.

Figure 2:
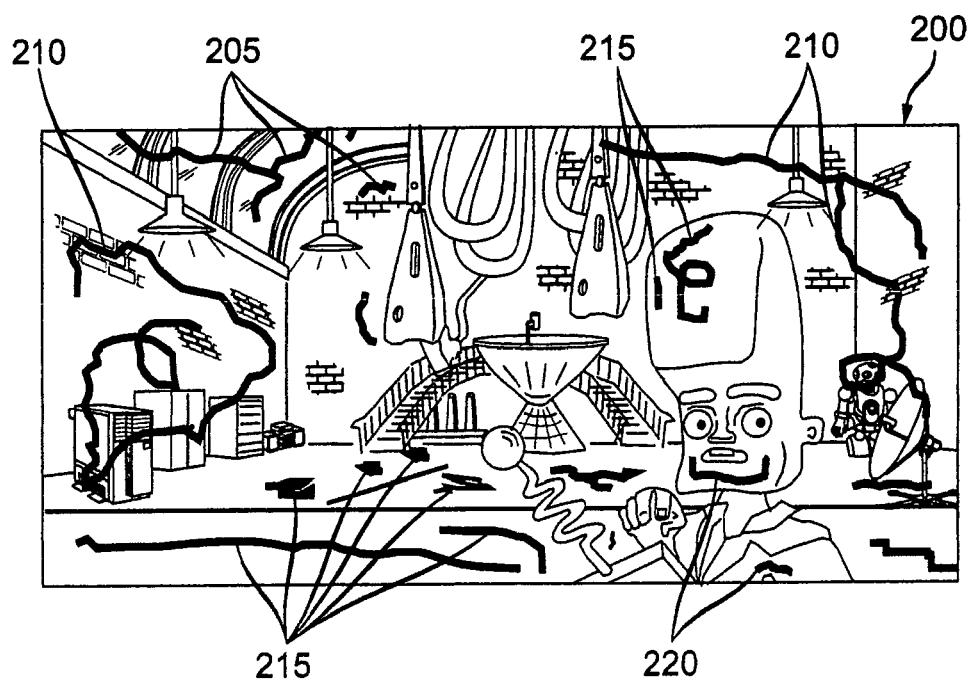
FIG. 2 is a video frame showing the user scribble marks according to the invention.

For the exposure map estimation, the method provides a means wherein the application is not required use the user-defined scribbles as direct constraints. Instead, the application can consider the scribbles which have been assigned with different exposure values as indicators for different categories (for instance, N scribbles correspond to N categories). FIG. 2 gives an example of HDR image marked with three scribbles (which can be non-continuous) which are shown in three different reference; however, in the actual software the three different scribbles are identified by different colors. (The scribbles can also be continuous and can be close-looped or open-looped.) The idea here is to classify all pixels in one frame into these N categories. Once the classification is done, each pixel can be associated with an estimated exposure value, which will be served as initial guess of the desired exposure map. The exposure map of each frame can be obtained by an edge preserving filtering on the previously obtained initial guess of exposure map.

To classify the pixels into N categories, the user can first form a feature vector for each pixel on the scribbles. These feature vectors can be obtained in a number of ways such as local averaging in different scales. The GMM models can be trained from these feature vectors. Finally the GMM model can be used as a classifier to classify all pixels in one frame into N categories.

The proposed method is a first attempt for interactive tone mapping for HDR video. It has advantages such as reasonable user input load as well as the flexibility to change the video appearance. In comparison, trivial extension of the interactive tone mapping can involve drawing scribbles on each frame, which needs tremendous user input load. The method can also avoid the tracking scribbles over time, which can be the source of temporal inconsistency if not well treated.

Figure 1:
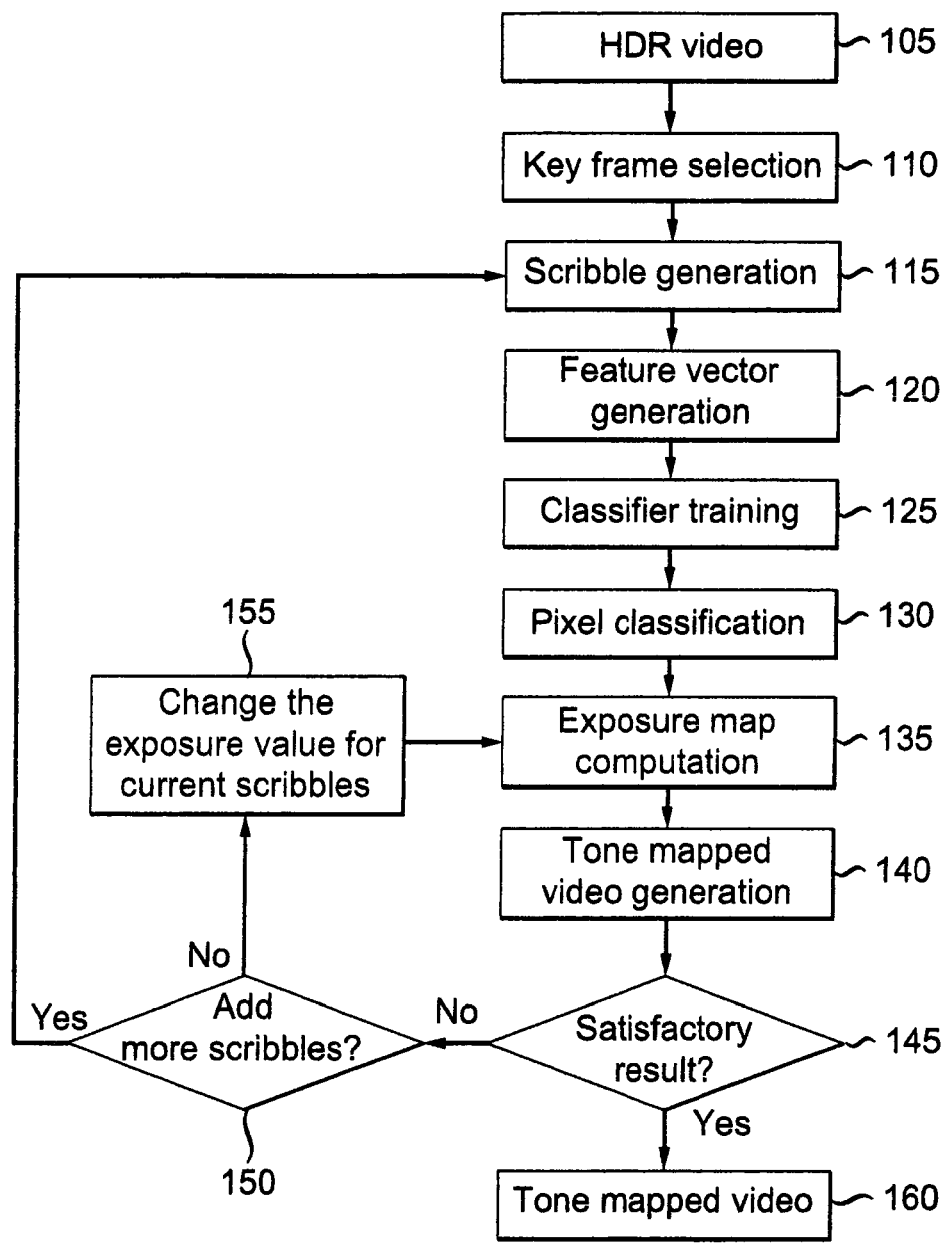
FIG. 1 is a flow diagram of the user interactive video tone mapping method according to the invention.

A preferred embodiment of the invention will now be described with reference to FIG. 1. The embodiment is essentially a video tone mapping workflow that can begin with the step of accessing HDR video 105 and then selecting a key frame 110 from a sequence of frames making up a scene. Here, through an appropriate user interface, the user can toggle through frames and select a key frame to which the user will draw scribbles/strokes/marks. Optionally, the key frame can also be recommended by a system automatically through some algorithm or the like. This could be the first frame, the middle frame or a frame meeting some predetermined statistical requirement such as being the frame with the closest to average luminance, mean luminance, etc.

Next, the user can generate or make scribbles 115 by using the interface (which can be a computer with appropriate display or the like and a mouse or track ball or the like for the actual drawing of scribbles on a displayed frame). The user can draw N scribbles on the key frame and then assign exposure values to each respective scribble. These exposure values will be used in step 135. The interface can have an appropriate algorithm which asks the user if more scribbles are desired and asks the user automatically to assign exposure values.

An example of the user-defined scribble is shown as in FIG. 2, which shows a key frame 200. In FIG. 2, there are numerous scribbles made by the user; however, in the current example there are actually only three sets of scribble 205, 210, 215. The first set 205 are scribble marks made by the user in which those marks will be treated the same, the second set 210 of scribble marks made by the user in which those marks will be treated the same, and likewise the third set 215 of scribble marks made by the user in which those marks will be treated the same. The different sets of scribble can be treated differently from one another. In operation with the user interface, the different sets of scribble marks can have different colors to remind the user what marks are associated with what set. Note that in the figure there are other scribble marks made by the user which are not labeled to keep the example simple.

The next step can be the creation of feature vectors 120 for the pixels along each scribble. These vectors can be computed or determined from the actual input signal for the frame. For every pixel in each category, a feature vector needs to be computed for GMM training. Similar to other recognition or classification applications, the feature vector should be designed in such a way that it can capture the unique characteristics of each category. The simplest form of feature vector is to use the luminance value of the pixel. In this case, feature vector is a one-by-one vector. RGB color coordinate of one pixel can also be used as a 3-by-1 feature vector. More complicated feature vectors can incorporate spatial information as well. Another embodiment involves the computation of the feature vector as multi-scale average around the specific pixel. For instance, the user can construct a feature vector as (L1, L2, L3) for a pixel where L1 is the luminance value of the pixel itself, L2 is the average luminance of all pixels inside a 5-by-5 window centered with this pixel and L3 is the average luminance of all pixels inside a 9-by-9 window centered with the pixel. This feature vector can in some sense capture information of a given pixel at different scales. This choice is made in favor of speed. A Gaussian filtering or other nonlinear filtering can be used instead more costly and complex filters.

Following the creation of feature vectors is the step of Gaussian Mixture Model (GMM) training 125 of N (number of scribbles) GMM models. Here models are trained using corresponding feature vectors. In the example in FIG. 2. N is 3. For each category, one GMM model is trained based on the feature vectors of pixels that belong to the same category. Take the first set of scribbles 205 in FIG. (which could be the shown as being in red). First, the feature vectors for all the pixels along the first set are computed as described in Step 115. Then, the user can initialize the GMM model training by specifying the number of Gaussians in the GMM model. Afterwards a standard GMM training algorithm can be used to estimate the parameters of the GMM model.

GMM training can be done with any off-the-shelf GMM parameter estimation method, such as Expectation Maximization algorithm disclosed by Christopher M. Bishop in the textbook "Pattern Recognition and Machine Learning," (Springer, October 2007). The same process is repeated for every category to train a separate GMM model. For example, as shown in FIG. 2, three GMM models are obtained for the first set 205, the second set 210, and the third set 215 of scribbles, respectively.

Following the training step is the step of pixel classification 130 in which all the pixels are classified into N categories by using the trained GMM models. Once the GMM models are obtained from training, the user can apply these models to classify all the pixels into N categories. The classification is done by computing the likelihood of each pixel belonging to each category. This can be done by making a histogram of the pixels according to luminance and assigning probability parameters or weights to the individual pixels so that they can be in certain luminance regions. The pixel will be put into the category with the largest likelihood.

Next is the step of exposure map computation 135. Here, the initial guess of the exposure map is obtained by setting the same exposure value (assigned to each scribble from the user input) for all pixels in the same category. The final exposure map is computed by applying an edge preserving filtering on this initial guess. This step computes the exposure map for each frame. In previous steps, all pixels are classified into N categories and a user-defined exposure value is designated for each category. Hence, the user can assign the same user-defined exposure value to all pixels in the same category, to obtain an initial guess for the exposure map.

Afterwards, a smooth filtering can be applied based on the initial guess of exposure map. An edge preserving nonlinear filter could be used for this purpose. For instance, bilateral filtering or weighted least square filtering can be good candidates for smooth filtering. The weighted least square filter is known for halo artifact avoidance and is more suitable for this step. More specifically, the user can smooth the initial guess of exposure map by optimizing the function:

$$J = (f - g)^2 + \lambda \left( \frac{\left(\frac{\partial f}{\partial x}\right)^2}{|L_x|^\beta + \varepsilon} + \frac{\left(\frac{\partial f}{\partial y}\right)^2}{|L_y|^\beta + \varepsilon} \right)$$

where f is the exposure map to be estimated, g is the initial guess of exposure map. $L_x$ and $L_y$ are first order derivative of the HDR image in horizontal and vertical direction respectively. $\beta$ and $\varepsilon$ are two constants, typically taking values of 1.8 and 1e-5 respectively. $\lambda$ is a Lagrange multiplier, which is selected to balance the first term and the second term. Many well studied algorithms such as conjugate gradient descent can be used to accelerate the computation of finding the approximate solution of the above optimization problem.

Next is the step of tone mapping 140. Here tone mapping of the video is computated by dividing the original HDR frames by corresponding exposure map computed in step 135. The tone mapped frame can further be processed with a gamma correction step. This can be described as:

$$I = (H/E)^{1/\gamma}$$

where H is the HDR frame, E is the exposure map and $\gamma$ is a constant, typically takes values in the range [2.2,2.4] and represents the gamma of the output device (where the tone mapped video will be shown).

The method can further include a quality control check 145 in which the user can look at the tone mapped frames and, if satisfied, accept the selected set of parameters and complete the tone mapping 160. If the user is not satisfied, the user can provide more input adjustments. In other words, optionally, the user can check the look of the tone mapped video and make changes to the exposure value for the scribbles 155 and then repeat step 135 until the result is satisfactory. If the user would like to add another scribble in step 150, this is also possible, which is effectively repeating steps 115 to 140 until a satisfactory result is obtained.

The foregoing illustrates some of the possibilities for practicing the invention. Many other embodiments are possible within the scope and spirit of the invention. It is, therefore, intended that the foregoing description be regarded as illustrative rather than limiting, and that the scope of the invention is given by the appended claims together with their full range of equivalents.

The invention claimed is:

1. A method comprising the steps of:
   selecting a frame of a video sequence comprising a plurality of frames;
   providing a user interface for a user to manually apply scribble marks to the frame;
   manually applying N scribble marks to the frame, N being a whole number of value 1 or greater; and
   tone mapping multiple frames in the video sequence responsive to the scribble marks.

2. The method of claim 1 comprising:
   classifying pixels in the frame to N categories, the N categories correlate to the N scribble marks.

3. The method of claim 1 comprising:
   classifying pixels in the frame to N categories, the N categories correlate to the N scribble marks, wherein the classifying is applied to all frames in the video sequence.

4. The method of claim 3 comprising:
   generating an initial exposure map for the frame, wherein the initial exposure map is used to classify the pixel in the classifying step.

5. The method of claim 4 comprising:
   applying an edge preserving filter to generate a final exposure map, wherein the tone mapping step is further performed responsive to the final exposure map.

6. The method of claim 3 comprising:
   creating feature vectors from initial input pixel data of the video sequence for each pixel along the N scribe marks, wherein classifying step is responsive to the feature vectors.

7. The method of claim 6 comprising:
   applying at least one Gaussian mixture model in creating the feature vectors.

8. The method of claim 6 comprising:
   applying at least one Gaussian mixture model in creating the feature vectors, wherein the feature vectors of the pixels at least include three luminance values, a first value for the luminance of a given pixel itself, and the others being average luminance of the neighboring pixels using different window sizes.

9. The method of claim 6 comprising:
   applying an edge preserving filter to generate a final exposure map for each frame, wherein the tone mapping is performed by applying the final exposure map for each frame.

10. The method of claim 4 comprising:
    applying an edge preserving filter to generate a final exposure map, wherein the edge preserving filter is a bilateral filter or a weight least square filter;
    wherein the tone mapping is performed by applying the final exposure map for each frame.

11. The method of claim 1, wherein the N scribble marks is non-continuous.

12. A device, comprising:
    an interface configured to accept entry of a selected frame of a video sequence comprising a plurality of frames and to accept N manually applied scribble marks on the frame by a user input, N being a whole number of value 1 or greater; and a processor configured to tone map multiple frames in the video sequence responsive to the scribble marks.

13. The device of claim 12, wherein the processor is further configured to classify pixels in the frame to N categories, the N categories correlate to the N scribble marks.

14. The device of claim 12, wherein the processor is further configured to classify pixels in the frame to N categories, the N categories correlate to the N scribble marks, wherein the classification is applied to all frames in the video sequence.

15. The device of claim 14, wherein the processor is further configured to generate an initial exposure map for the frame, wherein the initial exposure map is used to classify the pixel in the classifying step.

16. The device of claim 15, wherein the processor is further configured to apply an edge preserving filter to generate a final exposure map, wherein the processor is configured to tone map responsive to the final exposure map.

17. The device of claim 14, wherein the processor is further configured to create feature vectors from initial input pixel data of the video sequence for each pixel along the N scribe marks, wherein the processor is configured to classify responsive to the feature vectors.

18. The device of claim 17, wherein the processor is further configured to apply at least one Gaussian mixture model in creating the feature vectors.

19. The device of claim 17, wherein the processor is further configured to apply at least one Gaussian mixture model in creating the feature vectors, wherein the feature vectors of the pixels at least include three luminance values, a first value for the luminance of a given pixel itself, and the others being average luminance of the neighboring pixels using different window sizes.

20. The device of claim 17, wherein the processor is further configured to apply an edge preserving filter to generate a final exposure map for each frame, wherein the processor is configured to tone map by applying the final exposure map for each frame.

21. The device of claim 15, wherein the processor is further configured to apply an edge preserving filter to generate a final exposure map, wherein the edge preserving filter is a bilateral filter or a weight least square filter; wherein the tone mapping is performed by applying the final exposure map for each frame.

22. The device of claim 12, wherein the N scribble marks are non-continuous.

* * * * *